United States Patent
Stach et al.

(10) Patent No.: US 6,672,103 B1
(45) Date of Patent: Jan. 6, 2004

(54) HIGH POWER DENSITY SORPTION HEAT STORE

(76) Inventors: Helmut Stach, Hartriegelstrasse 104, Berlin (DE), D12439; Peter Muenn, Boernestrasse 37-41, Berlin (DE), D13088; Bernd Fuesting, Parkstrasse 80, Berlin (DE), D13086; Hartmut Welke, Asternstrasse 4, Ahrensfelde (DE), D16354

( * ) Notice: Subject to any disclaimer, the term of this patent is extended or adjusted under 35 U.S.C. 154(b) by 0 days.

(21) Appl. No.: 10/183,169

(22) Filed: Jun. 28, 2002

(51) Int. Cl.[7] ............................................. F25B 17/08

(52) U.S. Cl. ........................ 62/480; 62/484; 62/485; 62/487; 62/494

(58) Field of Search ........................ 62/480, 484, 485, 62/487, 494

(56) References Cited

U.S. PATENT DOCUMENTS

| | | | |
|---|---|---|---|
| 5,005,371 A | | 4/1991 | Yonezawa et al. |
| 5,291,942 A | * | 3/1994 | Ryan ..................... 165/104.12 |
| 5,449,723 A | * | 9/1995 | Amano et al. ................. 526/67 |
| 5,518,977 A | * | 5/1996 | Dunne et al. .................. 502/68 |
| 5,660,049 A | * | 8/1997 | Erickson ...................... 62/107 |
| 5,766,519 A | * | 6/1998 | Erickson .................. 261/140.2 |
| 5,813,248 A | * | 9/1998 | Zornes et al. .................. 62/480 |
| 5,875,648 A | * | 3/1999 | Boye et al. .................... 62/480 |
| 6,103,143 A | * | 8/2000 | Sircar et al. ................. 252/373 |

FOREIGN PATENT DOCUMENTS

| | | |
|---|---|---|
| DE | 39 25 704 | 8/1989 |
| DE | 40 19 669 | 6/1990 |
| DE | 195 39 105 | 10/1995 |
| DE | 196 46 458 | 11/1996 |
| DE | 196 47 378 | 11/1996 |
| DE | 198 11 302 | 3/1998 |
| DE | 199 63 3322 | 6/2001 |
| EP | 0 897 094 | 1/1995 |
| GB | 2 235 975 | 3/1991 |
| WO | WO 98/22193 | 5/1998 |
| WO | WO 99/09365 | 2/1999 |

OTHER PUBLICATIONS

"Sorptionsspeoicher–Saisonale Wärmespeicherung für die Solare Raumheizung", Autoren W. Mittelbach and H. M. Henning der Firma UFE Solar GmbH, pp. 1–7.

DIN 28 182: "Rohrbündel–Wärmeaustauscher Rohrteilungen, Durchmesser der Bohrungen in Rohroboeden, Umlenksegmenten und Stützplatten", Apr. 1987, pp. 1–3.

(List continued on next page.)

Primary Examiner—William Doerrler
Assistant Examiner—Mark Shulman
(74) Attorney, Agent, or Firm—Oblon, Spivak, McClelland, Maier & Neustadt, P.C.

(57) ABSTRACT

The invention relates to a high power density sorption heat store, preferably for storing low-temperature heat, and is characterized in that a tube jacket 2 is provided with tube bottoms 3, 3', and with heat exchange tubes 4, which penetrate the sorption layer 5 between the carrier floors 6, 6'; the mat layers 9, 9' are in each case located in between; the tube jacket 2 essentially is enclosed by a working fluid tank 10 comprising the working fluid lines 11, 11' including the valves 12, 12', which in turn are in connection with the mat layers 9, 9'; and the dip tank 13, in the bottom area, comprises the passage 16; and heat exchange tubes 4 are proportionally equipped with ribs 27, and are loosely guided through openings 29 of the carrier floor 6' and through the mat layer 9' but are fixedly connected with the tube bottoms 3, 3'; and the ribs 27 are enclosed by a finely perforated network 28. The associated method relates to the autothermal vaporization of the working fluid, wherein in an unloading process in a first step, the liquid level in the working fluid tank 10 by flowing goes over from the stand-by condition a into the start condition b, and in a second step, a vaporization of the remaining liquid contents of the working fluid tank 10 takes place.

20 Claims, 7 Drawing Sheets

OTHER PUBLICATIONS

DIN 28 185: "Rohrbündel–Wärmeaustauscher Rohrbündel–Einbauten", May 1988, pp. 1–4.

DIN 28 008: "Abmaße und Toleranzen für Rohrbündel–Wärmeaustauscher", Aug. 1983, pp. 1–15.

"Vorwort", p. 5, 1981, Verfahrenstechnische Berechnungsmethoden, Teil 1–Wärmeübertrager; Teil 5–Chemische Reaktoren; Apparate, Ausrüstung und ihre Berechnung, Deutscher Verlag Für Grundstoffindustrie, Leipzig 1981.

Übersetzungen von DIN–Normen, Manuskriptübersetzungen, DIN 28182 (w/translation), May 1987.

Übersetzungen von DIN–Normen, Manuskriptübersetzungen, DIN 28008 (w/translation), Aug. 1983.

"Sorption Storage–Seasonal Heat Storage for Solar Space Heating", Walter Mittelbach, et al., UFE SOLAR GmbH and Fraunhofer institute for Energy Systems pp. 1–7.

* cited by examiner

HIGH POWER DENSITY SORPTION HEAT STORE

BACKGROUND OF THE INVENTION

1. Field of the Invention

The invention relates to a high power density sorption heat store, in particular for the temporal-periodical storage of available heat, and to a method of heat storage.

2. Description of Related Art

Sorption heat stores are used to temporally and locally store periodically recurring heat energies with the help of a working fluid, in a targeted and user-friendly way allowing the power to be unloaded again, in a sorption-active microporous solid matter storage material. Preferred applications concern the seasonal or short-term storage of heat in housing and building technologies for heating and air-conditioning of rooms or to heat service water. Modern systems of sorption storage consist, as a rule, of a heat-insulated container that is periodically loaded with heat power in a targeted manner, and is again unloaded upon recall. For this purpose, the working fluid is periodically transformed in a gaseous state by means of vaporizers, and is bound to suitable porous sorbents during the storage unloading process. During this, sorption heat is released, which can be supplied to further liquid or gaseous heat exchangers via circuits for the available heat. In the loading process of the stores, a removal of the working fluid from sorbents is carried out through means of desorption. This ensues by feeding heat from power supply networks or, preferably, from other locally available sources of heat, such as devices for obtaining solar power or geothermal heat, with the working fluid being again liquefied in associated condensers. Less expensive thermal or electric forms of power may thus be stored during slack periods in power supply networks, with the advantage of then having additional amounts of available heat to be drawn on in periods of increased power demand.

According to "*Sorptionsspeicher—Saisonale Wärmespeicherung mit hohen Energiedichten*" (Sorption stores—seasonal heat storage with high power densities), a company publication of UFE SOLAR GmbH, Alfred-Nobel-Strasse 1, D-16225 Eberswalde/Brandenburg, written by W. Mittelbach and H.-M. Henning, the power densities exceed those of a conventional water storage unit by four to five times, depending on the depth and range of the storage state created.

In more recent proposals concerning sorption stores, it is asserted to increase the power storage densities and the thermal efficiency initially by introducing verbal concepts such as "compact store" or "high-performance store" and the technical measures derived therefrom, in that, on the whole, in a space delimited due to the geometric dimensions of the apparatus, the at least three, originally spatially separated areas sorption area, vaporizer and/or condensation area, and an area for stocking the working fluid, normally water, are united in one common container. Solutions like this (cf. DE 40 19 669, DE 198 11 302, and EP 0 897 094) are relatively simple to manufacture and can be installed in secondary rooms of buildings, e.g., of houses, and may be operated with a certain expenditure for the regulation and control alone of valves, serving the purpose of heating, air-conditioning and preparing service water.

As a rule, the vaporizer and condenser are arranged below the sorbent chamber, and are periodically successively flowed through in most cases by two circuits representing alternatingly switched heat exchange circuits of fossil fuel-operated heating means and solar or geothermal circuits. The sorption-active store volume must be capable of being evacuated and hermetically sealed, in order to make maximum use of the cyclically reversible loading cycle existing between the loading and unloading process. Hence, the task of any development of a sorption store is to maximize this loading cycle that is determined pressure-dependent by two separated isotherms involved in the adsorption and desorption process.

In this process, however, basic problems arise in conjunction with the transport processes for fluid and heat with regard to the heating, cooling and working fluids both in the inner container volume, as well as via the surfaces of the conduit systems providing for said transport:

- The sorbents exhibit a markedly restricted heat conductivity, so that the desired positive heat balance is impeded in a preferred direction of the container, but also in one of its transverse directions. As a rule, the sorbents consist of granulized or pelletized particles, which, in the form of grain beds, are present between the heat and flow conducting equipment. For increasing the storage density, high filling portions are sought, whereby necessary installations imparting the heat restrict the storage-active space.
- The free paths for the transport of the working fluid are reduced within the beds due to the desired higher filling proportions with sorbents. Moreover, the sorbents have outer and inner pore systems, which have to be filled with working fluid as completely as possible, so as to achieve a high storage density.
- By combining vaporizer and condenser parts within one receptacle and in a narrow space, "bridges" short-circuiting the transport processes arise across the heat and flow conducting equipment within the receptacle, which shorten the desired course of the balance processes throughout the entire sorbent space and contribute to a flow bypass formation reducing the efficiency.
- In a configuration of the sorption store in a compactness which is not optimally high, the proportion of the external heat insulation has to be relatively large, so as to achieve that a sufficient power density remains maintained over a longer period of time. Internal insulations between the vaporizer and condenser, however, would additionally reduce the storage density. Accordingly, with an increase of the dimensional scale, the proportion of the external insulation may be reduced in that a temperature gradient is established from the inner and warmer to the outer and cooler spaces.

The more recent approaches scarcely furnish indications as to how to solve these problems, either.

It is, however, known that usual modern heat exchangers, e.g. designed as tube bundle or jacketed heat exchangers, are able to limit and even reduce these problems to a high degree with an optimal formation and configuration of up to several meters in diameter. Heat exchangers are available in standardized constructions and series established, for example, by norms for tubular bundle heat exchangers, such as the German Standards DIN 28 182: *Rohrleitungen, Durchmesser der Bohrungen in Rohrböden, Umlenksegmenten und Stützplatten*; DIN 28 185: *Rohrbündel-Einbauten* or DIN 28 008: *Abmaße und Toleranzen*. The correspondingly highly sophisticated knowledge on their design and dimensions is likewise contained in standard works, such as in the handbooks "*Verfahrenstechnische Berechnungsmethoden*"

Teil 1—*Wärmeübertrager;* Teil 5—*Chemische Reaktoren; Apparate, Ausrüstung und ihre Berechnung*, published by Deutscher Verlag für Grundstoffindustrie, Leipzig, 1981.

Furthermore, it is known from DE 39 25 704 that using ribbed tubes as inner tubes, a relatively long travel path and a large transfer surface for the second heat transfer medium around the inner tube, and hence a good heat transmission is achieved in that, for example, a flexible hose structure forming a flow channel is shrunk onto the ribs. Such modified ribbed tubes, however, do not yet allow a suitable guidance of the flow of working medium which must be in connection with the sorbent via openings. For this reason, more recent arrangements as in DE 195 39 105 relate to so-called sorption heat exchangers, in which the channels for the working fluid flowing in vapor form and the inner heat-conducting elements are largely matched to one another in one of the transverse dimensions. So as to increase the dimensional scale, a favorable guidance of the working fluid may also ensue in a preferred longitudinal direction (the main axis of the apparatus), which guidance, however, is not yet assured with the chosen known arrangement of heat-conducting lamellae. In sorption heat stores, the possibilities of increasing the dimensional scale are limited by the fact that, process-contingently, the solid sorbent cannot be moved like a fluid.

The concern of realizing the vaporization and condensation processes in one common apparatus and in a compact configuration, to date has only been introduced on a major economic scale in the field of thermal material separation, such as distillation and rectification, e.g. for separating hydrocarbon mixtures to obtain fuel for internal combustion engines. In water vaporization and condensation processes, e.g. for the purpose of water purification, this process may then turn out to be uneconomic, due to the high vaporization heats required, when a combined heat process between various partial processes or apparatus parts is not given, e.g. by means of heat pumps. The efficiency of vaporization and condensation processes, such as e.g. in DE 196 46 458 and DE 196 47 378 concerning the field of water treatment and water purification, may be increased in that vaporizer and condenser are neighboring each other, that a stepped heat gradient exists between these two, and that the condensation of the vapor ensues in a direct heat contact by means of a guidance through the condensate which is already present, at least proportionately. This heat pump effect in a way simulated is advantageously achieved within contact condensers and by slowing down the two-phase mixture flowing through the condenser while condensing. In a variant of the sorption heat store as per DE 198 11 302, a so-called tank-in-tank arrangement, it is already indicated that the active storage volume is enclosed by a condenser or by the condensate container. With respect to a decreasingly graduated heat transfer from the inside to the outside, this arrangement has advantages in the transverse dimensions, in that in the interior of the store, a heated storage volume forms having a temperature gradient in the peripheral direction, a condensation zone arises having a low temperature, so that the outer heat insulation of the container is to a certain extent relieved in its heat-insulating functions, and correspondingly may be designed lower. In a schematic representation of the condensation device, however, here, as well, statements as to their configuration are not made. No other solutions became known either, in which the vaporization of the working fluid takes place directly in the store and in the immediate proximity of the sorbent chamber.

SUMMARY OF THE INVENTION

The invention relates to a high power density sorption heat store, preferably for storing low-temperature heats, and is characterized in that, in accordance with the state of the art, simple instrumental extensions for the heat conduction and flow guidance of the working fluid are incorporated in commercially available and standardized heat exchangers of various types for fluid and heat transformation in solid matters, which instrumental extensions achieve an improvement of the thermal efficiency due to a combined heat process in the sorption heat store 1 itself, a tube jacket 2 being provided having tube bottoms 3, 3' and heat exchange tubes 4 penetrating the sorption layer between the carrier floors 6, 6', with mat layers 9, 9' being in each case located in between, the tube jacket 2 being essentially enclosed by a working fluid tank 10 comprising working fluid lines 11, 11' including the valves 12, 12', which in turn are in communication with the mat layers 9, 9', and the dip tank 13 comprising the passage 16 in the bottom area, as well as that heat exchange tubes 4 are proportionately provided with ribs 27 and are loosely guided through openings 29 of the carrier floor 6' and the mat layer 9', but are fixedly connected with the tube bottoms 3, 3', and the ribs 27 are enclosed by a finely perforated network 28. The associated method relates to the autothermal vaporization of the working fluid, whereby in a unloading process in a first step the liquid level in the working fluid tank 10 goes over by flowing from the stand-by condition (a) into the start condition (b), and in a second step, a vaporization of the remaining liquid content of the working fluid tank 10 takes place.

DETAILED DESCRIPTION OF THE INVENTION

The invention is based on the problem of eliminating the disadvantages of the solutions proposed in the prior art.

The problem was solved by means of a high power density sorption heat store, in which standardized and commercially available heat exchangers, preferable bundle tube heat exchangers of the known embodiment and of metallic construction are used as the base body for a sorption heat store. The outer shell is surrounded by a tank serving for stocking the working fluid and for vaporizing the working fluid. In a cost-efficient manner, it is comprised of synthetic material, preferably of a mineral fiber-reinforced thermoplastic material. The heat exchanger and the tank can be commonly evacuated and can be hermetically sealed, and are surrounded by a common heat insulation. Between the carrier floors, heat exchange tubes are attached and penetrate the sorption layer in accordance with the carrier floor division. A particularly inventive idea consists in that the heat exchange tubes are only loosely guided through the openings of likewise standardized carrier floors for the sorbent, having division ratios of the openings corresponding to those of the heat exchange tubes. The permitted and standardized maximum tolerance spacings of the corresponding tube and opening diameters between the tubes and the flanged edges of the openings, constitute the circular passage openings for the vaporized working fluid into and out of the sorption layer. It is understood that the tolerance spacings, in the millimeter or submillimeter range, are below the smallest dimension of the sorbent particles present in the bed. The transport of the liquid or already vaporized working fluid in each of the transverse directions of the heat exchanger is provided for by the temperature-resistant mat layers that are situated between the carrier floors and the carrier layers. The mat layers preferably consist of a non-woven fiber mat that is absorbent and takes up the originally liquid working fluid and prevents drops which could damage the sorbent from directly entering into the bed. In this case, the flanged edges additionally prevent the layers of the still liquid working fluid covering the carrier floors from flowing into the sorption layer.

The inventive high power density sorption heat store has the advantage of recurring to successful solutions for heat exchange processes and the chemical-catalytic reaction technology, as far as its design and configuration is concerned, and of allowing for an accurate enlargement of the dimensional scale with respect to the state of knowledge on fluid and heat exchange processes on solid matter beds.

Surprisingly, it has turned out that the inventive sorption heat store exhibits an improved guidance of the working fluid, which is intended to vaporize during the unloading process in the volume of the sorbent via an extended surface cross-section of the device in the immediate proximity of an input of the heat carrier.

Furthermore, it is advantageous that the condensation of the vaporized working fluid takes place outside of the sorbent volume via a direct heat exchange with its own condensate, and that the condenser part simultaneously constitutes the tank-like reservoir supply of the store with liquid working fluid.

The inventive high power density heat sorption store is suited for the temporal-periodic storage of heat, preferably inputting low-temperature heat from solar or terrestrial origin, and outputting available heat to a heat exchange network. In accordance with the technical state of development, commercially available and standardized heat exchangers of various types may be used, such as are usual in the field of the chemical process engineering and chemical-catalytic reaction technology. With the participation of actively reacting and absorbing solid matters, simple instrumental extensions for the heat conduction and flow guidance of the working fluid are incorporated for the purpose of its capability of evaporating and condensing, which extensions achieve an improvement of the thermal efficiency by a combined heat process in a compact sorption heat store 1 itself, with known techniques being used for enlarging the dimensional scale, and larger widths of various size ratios, performance ranges and application fields being covered.

The mat layers may also consist of a package of a bedded material absorbing liquid, e.g. of foam particles or of porous mineral granulates. They may also contain heat-conductive, preferably metallic fibers. Likewise, they may consist of fibrous, woolen or knitted mats proportionally containing more extended metallic components, such as wires or spirals made thereof. Finally, they may also consist of foam metals forming open-pored cellular structures. The metallic components may also be lyophilized, and may therewith be wetted by liquids. Within the mat layer, auxiliary heating means may also be arranged, e.g. in the form of additional heat exchangers or as electric filament windings, which additionally support the vaporization of the working fluid.

The unloading process of the store by adsorption advantageously ensues in the autothermal way, since with the opening of the feed valve for the working fluid in the area of one tube bottom, sufficient heat amounts are immediately available in the vaporizer part by liberation of adsorption heats due to the abruptly arising temperature increase in the evacuated sorbent. The initiation of the vaporization process hence starts independently due to the presence of minor residual vapor pressures of the working fluid at temperatures of the mat layers and carrier floors which are still low. The liquid level in the tank falls from a stand-by condition to a lower level, the start condition, which is determined by the proportion of the liquid that has already settled on the carrier floor and has penetrated into the mat layer, and that cannot further diminish for the time being via a working fluid line which is open on the top and is provided with an upper opening. Only with an increasingly raising temperature in the heat store, the working fluid in the tank, as well, starts to vaporize, and hence enters then into the mat layer in the form of vapor via the working fluid line that is opened on the top. Thus, the sorption heat store has a stable operational behavior or even certain "emergency start qualities" without an undesired penetration of still liquid working fluid into the sorbent layer taking place.

The carrier floor in the proximity of the second carrier floor of the heat exchanger, which appropriately is configured completely identical, may consist of a mat layer provided with the same fiber mat, via which ensues the desorption during the loading process of the sorption heat store. The associated working fluid line is guided within a dip tank in the tank, is downwardly directed via an exhaust valve and, on the other hand, is opened towards the forming condensate. In its lower zone, the dip tank features passage openings for the fluid diphase mixture that is guided through the forming and banking liquid condensate. On the exterior wall of the dip tank, a heat exchanger is located that is preferably realized and wound as a tube coil. By feeding a coolant through this heat exchanger, a partial condensation of the working fluid vapor may first ensue on the inner wall of the dip tank, and then a more complete condensation may follow on the exterior wall including the tube coil.

Loading of the heat store is initiated by applying a vacuum in the head area. The dip tank acts as a contact condenser. Possible non-condensed components of the working fluid are separated in an aftercondenser that is connected upstream of the vacuum generator and is appropriately air-cooled. A modification of the heat store is also proposed, in which the condensation takes place effectively and in two stages via a head condenser, which is in flow-side connection with the dip tank. In heat stores having larger transverse dimensions, at least two working fluid lines ending in individual dip cups might be useful for an efficient condensation.

Since both in the loading and the unloading process, heat for the condensation of the working fluid has to be fed into the heat store in a process-contingent manner, additional heaters may be mounted on the heat exchange tubes, here, as well, for example in the form of heating coils or electric filament windings.

By introducing various arrangements for the heat exchange in the vaporizer and condenser part through a heat pump effect, flow convection and heat conduction, an intensive combined heat process may in cases be achieved even in different parts and in locally separated zones of the inventive sorption heat store, which can be controlled and regulated via appropriate circuits.

A further inventive idea consists in using modified heat exchange tubes for the vaporization and condensation processes, which are mounted in a selected division arrangement of the tube and carrier floors, in such a manner that also in a preferred direction of the apparatus, the longitudinal direction of the heat store, a flow-promoting guidance takes place with a distribution of the working fluid in the longitudinal direction. This is then particularly reasonable when a large length/diameter ratio of the sorption heat store has to be adjusted, and the risk of an incomplete longitudinal balancing of the working fluid flow in the sorption layer has to be excluded. Purposefully, ribbed tubes are used as the heat exchange tubes, which, as vaporizer tubes are surrounded by a perforated network on their circumference, thus forming an additional flow channel and featuring openings for the working fluid passage into the sorption layer. Here again, these openings are intended to have dimensions that are considerably smaller than the sorbent grain sizes. When the ribs are oriented transversely to the working fluid flow, e.g. in the form of a spiral winding on the heat exchange tube, then the working fluid may flow in the axial direction over larger travel paths within the sorption layer, and may thus reach various vertical layers while vaporizing at the same time. Correspondingly arranged condensate tubes appropriately are provided with longitudinal ribs, on which the condensate at least in part runs down and may be drawn off in a lower mat layer.

Within the flow channels, as well, mat layers may be present. It is in particular advantageous that the mat layers for the vaporizer and condenser parts, due to the capillary forces exerted on the working fluid, act in a certain independence of gravitational force. Thus, horizontal or oblique arrangements of the sorption heat store in the surrounding space become possible for the purpose of being adapted to local conditions. In this way, heat stores are created in appropriate sizes and storage capacities available to a commercial or also industrial use, and which may be accommodated in larger indoor rooms.

It has also been found that the elements configured as vaporizer parts can also function as condenser parts, and vice versa, and that they can replace each other. These modifications are purposeful for sorption heat stores of smaller dimensions, such as private household heat stores.

Of course, several inventive sorption heat stores may be modularly interconnected. According to the state of the art, these are at least two heat stores which are operated in the loading and unloading condition in a cyclic-alternating manner.

The essence of the invention consists in a combination of known elements that mutually complement each other and hence result in the advantage of use, which resides in that a high power density sorption heat store is made available.

The invention will be explained by means of realization examples without any restricting effect.

REALIZATION EXAMPLES

Example 1

Figure 1:
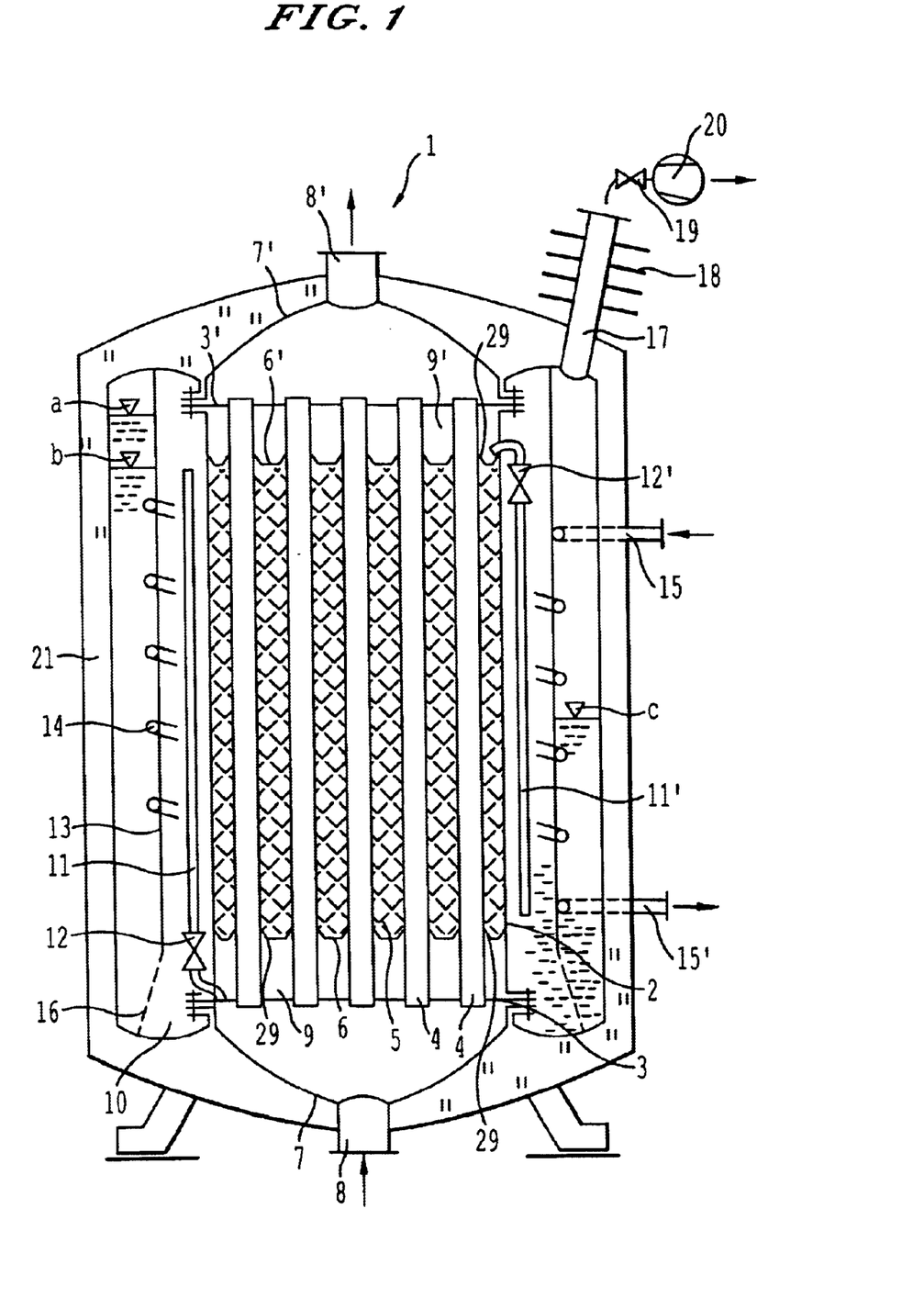
FIG. 1 the sorption heat store in an upright perpendicular tank-in-tank container form as a modified tube bundle heat exchanger, including plain tubes for the heat exchange, FIG. 2 a modification of the heat store according to FIG. 1, however, including immersion tubes for the heat exchange, and an additional head condenser, FIG. 3 a modification according to FIG. 2, including an external tank for the working fluid, with the two tank halves drawn separately representing identical parts of the same tank, FIG. 4 a configuration of a heat exchange tube including an integrated vaporizer and condenser part, respectively, FIG. 5 a modification according to FIG. 1, including a perpendicular vaporizer/condenser part according to FIG. 4, FIG. 6 a modification according to FIG. 1, including a perpendicular condenser/vaporizer part according to FIG. 4, FIG. 7 a modification of the heat store according to FIG. 1, however, in a horizontal configuration, including deviating tubes for the heat exchange and a vaporizer according to FIG. 4, and including a plate condenser.

With reference to FIG. 1, the sorption heat store 1 consists of a tube jacket 2, which is connected inside of the two tube bottoms 3, 3' with heat exchange tubes 4. The heat exchange tubes 4 penetrate the sorption layer 5, which in turn is arranged within the two carrier floors 6, 6' between the tube floors. Tube bottom 3 is equipped with the bottom dome 7, tube bottom 3' is equipped with the upper dome 7', on which the connecting sleeves 8, 8' of the heat carrier are located accordingly. Between the tube bottoms 3, 3' and the carrier floors 6, 6', the mat layers 9, 9' are in each case incorporated. The tube jacket 2 is essentially enclosed by a working fluid tank 10 comprising the working fluid lines 11, 11' with the valves 12, 12', which in turn are in connection with the mat layers 9, 9'. The dip tank 13 carries the coiled tube 14 including the lines 15, 15', and features the passage 16 in the bottom zone. In the upper zone, the suction port 17 is situated, which goes over into the aftercondenser 18 and which is connected with the vacuum pump 20 via the suction valve 19. The sorption heat store 1 is surrounded by insulation material. The aftercondenser is air-cooled.

Example 2

Figure 2:
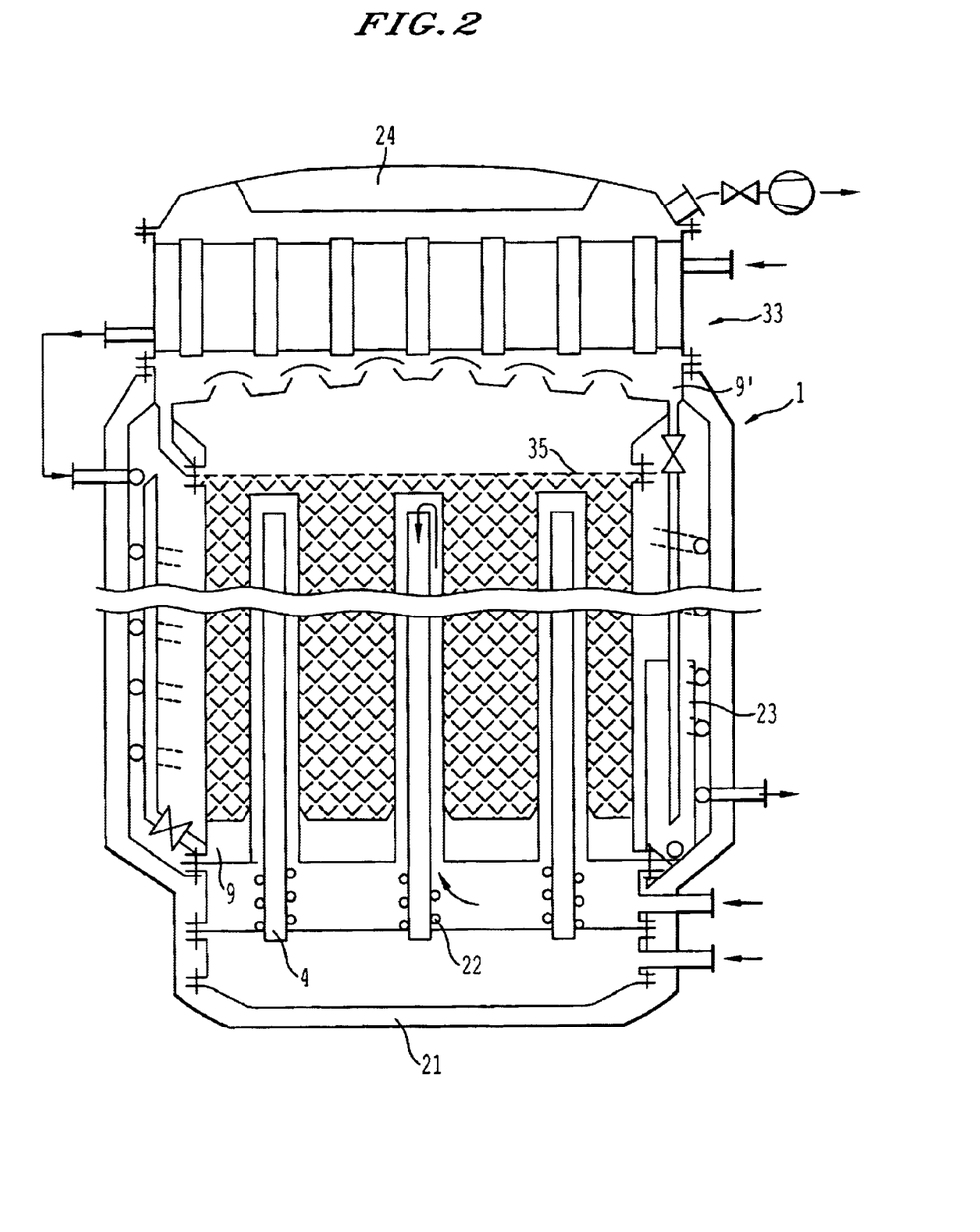

With reference to FIG. 2, the heat exchange tubes 4 are equipped with an additional heating means 22 in the proximity of the tube bottoms 3, 3'. The dip tank 13 has the shape of a cup 23. The sorption layer 5 is obturated with a sieve bottom 35. In a condenser 33 arranged on the top of the heat store, conducting means 24 are situated.

Example 3

Figure 3:
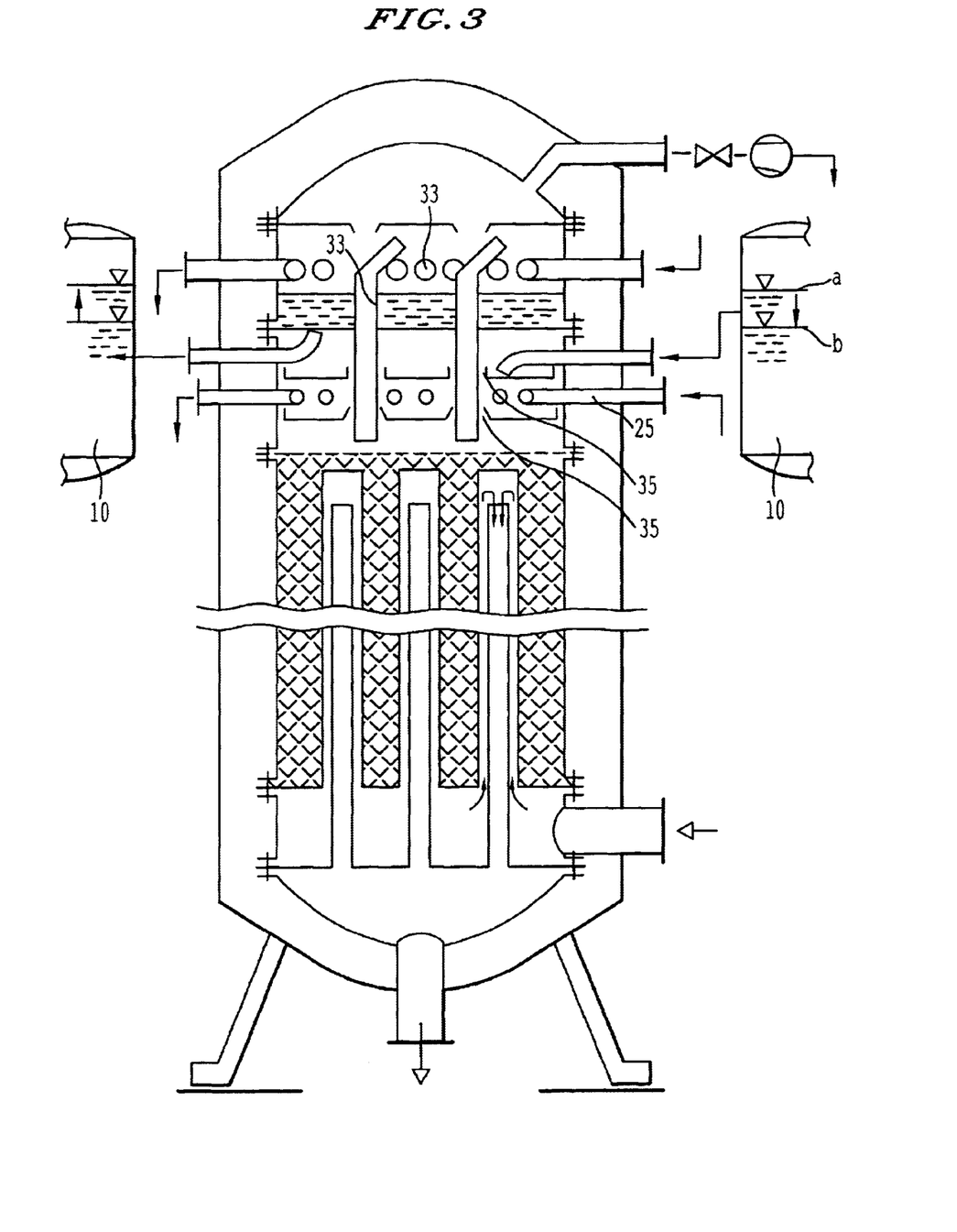

With reference to FIG. 3, an auxiliary heating means 25 is provided within the vaporizer 3. In the condenser 33, an additional cooling means 26 is incorporated.

Example 4

Figure 4:
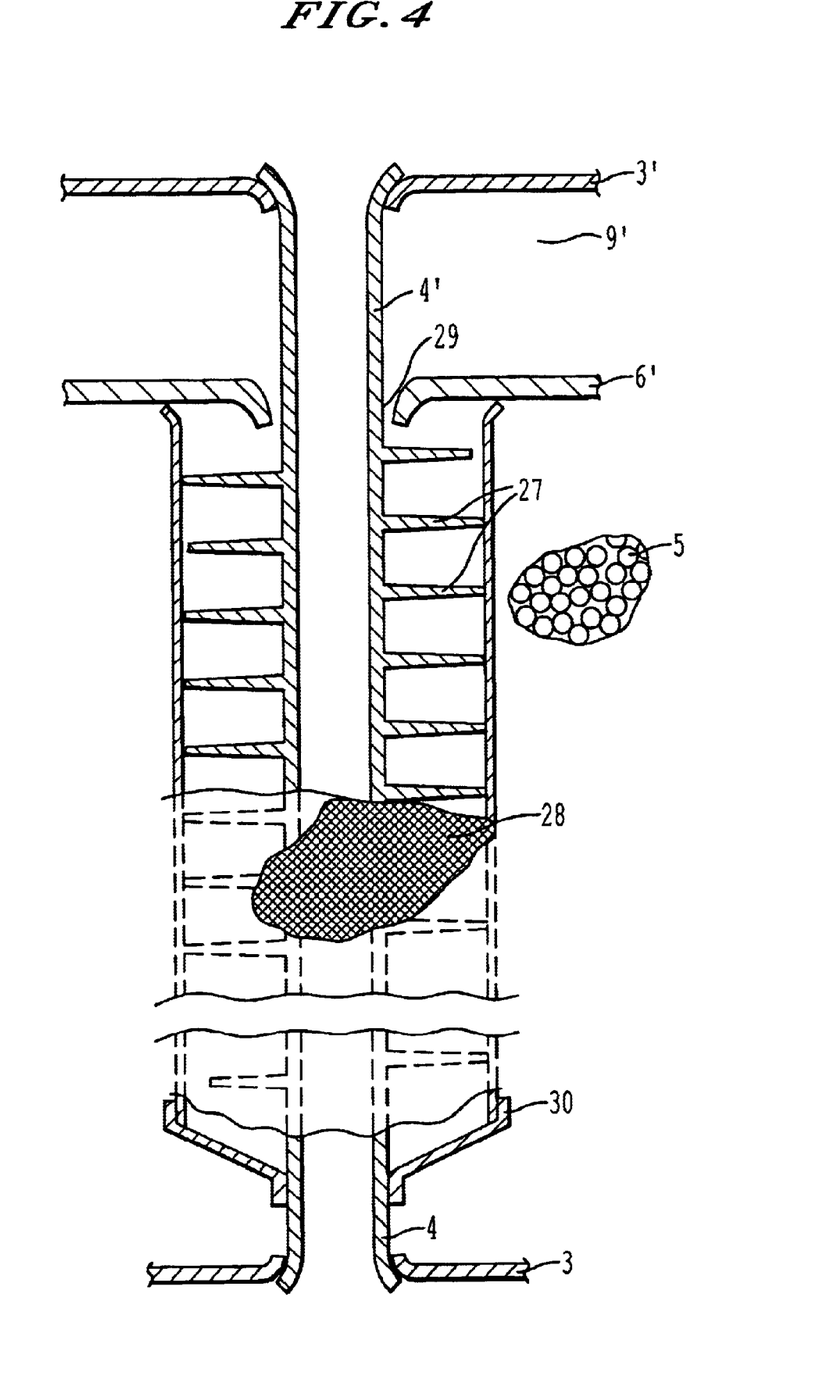
Figure 5:
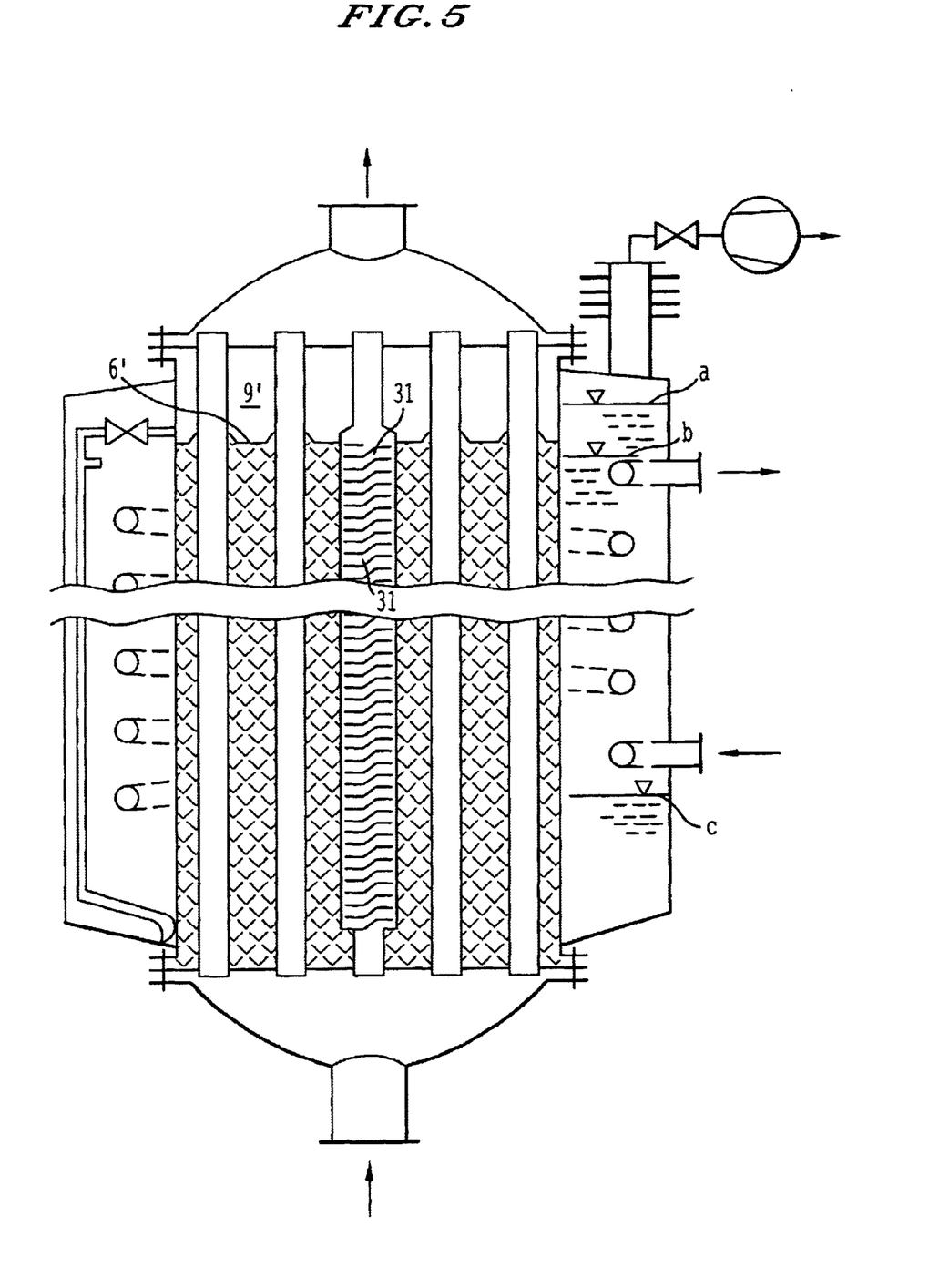

FIG. 4 shows a particular realization of the guidance for the working fluid, in the form of heat exchange tubes 4 provided with ribs 27 mounted in a spiral-shape, which heat exchange tubes are loosely guided through openings 29 of the carrier floor 6' and the mat layer 9', but are firmly rolled into the tube bottoms 3, 3'. The ribs 27 are enclosed by a finely perforated network 28. Purposefully, a cap 30 serves as the terminal seal. With reference to FIG. 5, this form of a working fluid guidance is used in smaller sorption heat stores as a vaporizer part 31 arranged centrally-axially with respect to the tube jacket 2. The line 11 features a passage 34. In the FIGS. 5 through 7, the insulation 21 is not represented.

Example 5

Figure 6:
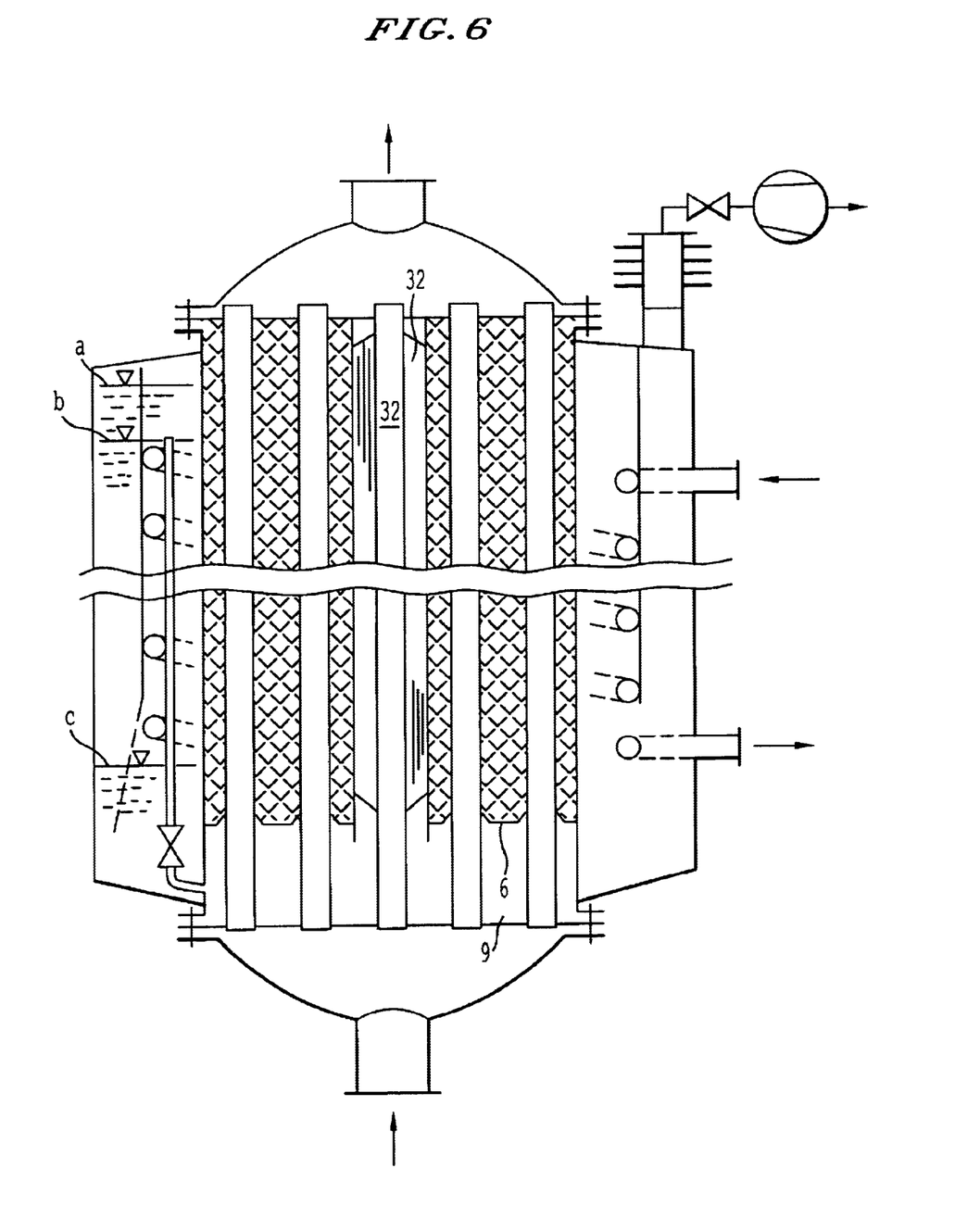

FIG. 6 shows a realization analogous to that of FIG. 5, with the central heat exchange tube 4 being a condenser part 32 similar to that of FIG. 4 and being provided with longitudinally directed ribs 27.

Example 6

Figure 7:
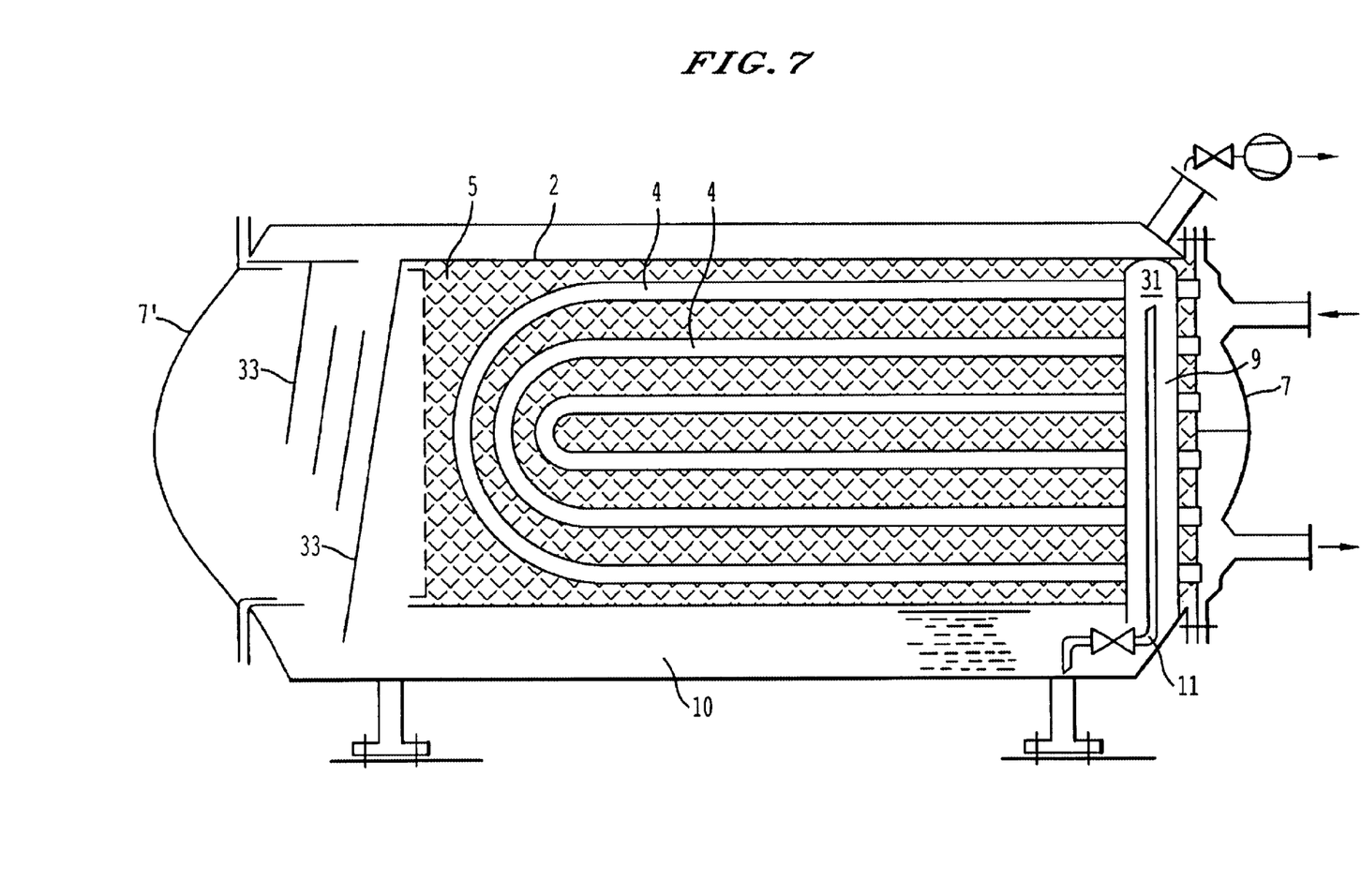

With reference to FIG. 7, the vaporizer part 31 including the mat layer 9' is arranged candle-like in a plane transverse to the longitudinal axis of the sorption heat store, and is arranged adjacent to said longitudinal axis, and is comprised of two ducts of heat exchange tubes 4. The tube bottoms 3, 3' are coincidingly identical. The condenser part 33 is a plate condenser. The tube jacket 2 and the tank 10 are arranged asymmetrical to each other.

In the stand-by condition a of the sorption heat store, the liquid working fluid is on a level situated above the inflow opening of line 11. During unloading, after opening valve 12, the liquid level of the liquid working fluid falls to the start condition b. Due to the subsequent complete vaporization of the working fluid, the store is unloaded.

In loading the store, the valves 12' and 19 are first opened, and a connection to the vacuum pump 20 is established. After closing of valve 19, an operation condition c arises during the condensation of the working fluid, which is terminated with the stand-by condition a.

List of reference numerals
1 Sorption heat store
2 Tube jacket
3 Tube bottom
3' Tube bottom
4 Heat exchange tube
5 Sorption layer
6 Carrier floor
6' Carrier floor
7 Bottom dome
7' Upper dome
8 Connecting sleeve
8' Connecting sleeve
9 Mat layer
9' Mat layer
10 Working fluid tank
11 Working fluid line
11' Working fluid line
12 Valve
12' Valve
13 Dip tank
14 Coiled tube
15 Feed line
15' Feed line
16 Passage
17 Suction port
18 Aftercondenser
19 Suction valve
20 Vacuum pump
21 Insulation material
22 Additional heating means
23 Cup
24 Conducting means
25 Auxiliary heating unit
26 Supplementary cooling means
27 Rib
28 Network
29 Opening
30 Closing cap
31 Vaporizer part
32 Condenser part
33 Condenser
34 Passage
35 Sieve bottom
  a Stand-by condition
  b Start condition
  c Operating condition

What is claimed is:

1. A high power density sorption heat store, comprising:
a tube jacket which is provided with an upper and a lower tube bottom and with a plurality of heat exchange tubes each of which penetrate a sorption layer between an upper and a lower carrier floor;
wherein the lower tube bottom, in a bottom area of said high power density sorption heat store, is provided with a lower dome;
wherein the upper tube bottom, in a top area of said high power density sorption heat store, is provided with an upper dome
wherein an upper connecting sleeve for heat exchange is located on said upper dome and a lower connecting sleeve for the heat exchange is located on said lower dome;
wherein an upper and a lower mat layer are incorporated between the upper and the lower tube bottoms and the upper and the lower carrier floors;
wherein said tube jacket is essentially enclosed by a working fluid tank comprising
two working fluid lines each of which comprise a valve which is in connection
with said upper and said lower mat layer;
a dip tank, in said bottom area of said high power density sorption heat store, which comprises a passage and carries a coiled tube that is equipped with two lines;
a suction port which is present in said top area of said high power density sorption heat store;
wherein said suction port is connected to a) an aftercondenser and b) a vacuum pump via a suction valve; and
wherein said high power density sorption heat store as a whole or at least in an area of said tube jacket is surrounded by an insulation.

2. The high power density sorption heat store of claim 1, wherein said heat exchange tubes are equipped with ribs and are loosely guided through openings of said upper carrier floor and through said upper mat layer, but are fixedly connected with said upper and lower tube bottom;
wherein said ribs are enclosed by a finely perforated network, and a cap serves as a terminal seal located in a proximity of said lower tube bottom or said upper tube bottom.

3. The high power density sorption heat store of claim 2, wherein said ribs have a spiral shape and form one or more vaporizer parts attached to said upper tube bottom.

4. The high power density sorption heat store of claim 1, wherein one of said plurality of heat exchange tubes forms a vaporizer part arranged centrally-axially to said tube jacket.

5. The high power density sorption heat store of claim 2, further comprising one or more condenser parts arranged in parallel to an axis of said tube jacket and attached to said lower tube bottom; and
wherein said ribs are arranged in a longitudinal axis of said plurality of heat exchange tubes.

6. The high power density sorption heat store of claim 1, further comprising a condenser which comprises conducting means; and a cooling means.

7. The high power density sorption heat store of claim 1, wherein said plurality of heat exchange tubes, in a proximity of said upper and lower tube bottoms comprise a heating means.

8. The high power density sorption heat store of claim 1, wherein said dip tank has the shape of a cup.

9. The high power density sorption heat store of claim 1, further comprising an auxilliary heating means within said upper or said lower mat layer.

10. The high power density sorption heat store of claim 1, wherein said tube jacket is arranged horizontally;
wherein one or more vaporizer parts is/are arranged candle-like in a plane transverse to a longitudinal axis of said high power density sorption heat store, and is/are arranged adjacent to said longitudinal axis, and is/are comprised of two ducts of heat exchange tubes, and said upper and said lower tube bottom are coincidingly identical.

11. The high power density sorption heat store of claim 1, wherein only one carrier floor of said upper and said lower carrier floor including one mat layer of said upper and said lower mat layer is present.

12. The high power density sorption heat store of claim 11, wherein one of the working fluid lines comprises a passage.

13. The high power density sorption heat store of claim 1, wherein said upper or said lower or both mat layers comprise a fibrous, woolen or knitted mat.

14. The high power density sorption heat store of claim 1, wherein said upper or said lower or both mat layers comprise a package of porous foams or granulates.

15. The high power density sorption heat store of claim 13, wherein said upper or said lower or bottom mat layers comprise a metallic component in the form of a wire or a wire spiral.

16. The high power density sorption heat store of claim 2, wherein said upper or said lower or bottom the mat layers protrude into a vaporizer part or a condenser part and is/are enclosed by said condenser part within a finely perforated network.

17. A method of realizing cyclical processes for heat storage inside a high power density sorption heat store according to claim 1, comprising:
   autothermally vaporizing a working fluid in the lower mat layer.

18. The method of claim 17, further comprising
   transforming a liquid level in said working fluid tank by flowing from a stand-by condition (a) into a start condition (b); and
   vaporizing of a remaining liquid contents of said working fluid tank.

19. The method of claim 17, further comprising adjusting an operating condition (c) in said working fluid tank;
   wherein said operating condition (c) has a liquid level that is above a liquid level of a condensing diphase mixture.

20. The high power density sorption heat store of claim 14, wherein said upper or said lower or bottom mat layers comprise a metallic component in the form of a wire or a wire spiral.

* * * * *